US010409399B2

(12) United States Patent
Hosono (10) Patent No.: US 10,409,399 B2
(45) Date of Patent: Sep. 10, 2019

(54) INPUT DEVICE AND INPUT METHOD (71) Applicant: JVC KENWOOD Corporation, Yokohama-shi, Kanagawa (JP)

(72) Inventor: Eiiti Hosono, Yokohama (JP)

(73) Assignee: JVC KENWOOD Corporation, Yokohama-shi (JP)

(*) Notice: Subject to any disclaimer, the term of this patent is extended or adjusted under 35 U.S.C. 154(b) by 174 days.

(21) Appl. No.: 15/658,474

(22) Filed: Jul. 25, 2017

(65) Prior Publication Data

US 2017/0322638 A1 Nov. 9, 2017

Related U.S. Application Data (63) Continuation of application No. PCT/JP2015/080575, filed on Oct. 29, 2015.

(30) Foreign Application Priority Data

Mar. 5, 2015 (JP) ................................. 2015-043293

(51) Int. Cl.
G06F 3/0354 (2013.01)
G06F 3/038 (2013.01)
G06F 3/0488 (2013.01)
G06F 3/044 (2006.01)
G06F 3/03 (2006.01)
G06F 3/041 (2006.01)
G06F 3/0484 (2013.01)

(52) U.S. Cl.
CPC ............ *G06F 3/038* (2013.01); *G06F 3/0304* (2013.01); *G06F 3/03545* (2013.01); *G06F 3/041* (2013.01); *G06F 3/044* (2013.01); *G06F 3/0488* (2013.01); *G06F 3/04883* (2013.01); *G06F 3/04845* (2013.01); *G06F 2203/04104* (2013.01); *G06F 2203/04806* (2013.01); *G06F 2203/04808* (2013.01)

(58) Field of Classification Search
CPC ....... G06F 3/03545; G06F 2203/04806; G06F 2203/04808
See application file for complete search history.

(56) References Cited

U.S. PATENT DOCUMENTS 9,110,543 B1 * 8/2015 Dabell .................... G06F 3/044
2014/0368430 A1 12/2014 Choi

FOREIGN PATENT DOCUMENTS

JP 2011-143557 A 7/2011

* cited by examiner

*Primary Examiner* — Christopher J Kohlman
(74) *Attorney, Agent, or Firm* — Brundidge & Stanger, P.C.

(57) ABSTRACT

A contact unit includes a plurality of areas capable of exciting a surface of a touch panel individually. A control unit controls a state of the plurality of areas individually based on a pre-stored excitation pattern when a user control unit is used. The excitation pattern describes a state transition pattern of the plurality of areas corresponding to a track of a multi-touch gesture such as a pinch-out gesture and a pinch-in gesture.

3 Claims, 5 Drawing Sheets

INPUT DEVICE AND INPUT METHOD

BACKGROUND OF THE INVENTION

1. Field of the Invention

The present invention relates to input devices and input methods for controlling touch panels.

2. Description of the Related Art

Many electronic devices such as smart phones, tablets, car navigation devices, and mobile game devices are provided with a touch panel display. A touch panel is usually controlled directly by a finger but may be controlled by a stylus pen in some cases. Use of a stylus pen enables more precise pointing than with a finger. It also prevents the surface of the touch panel from being contaminated with a fingerprint.

Patent document 1 discloses a technology of providing a pen with a plurality of buttons and sending a control signal associated with the pressing of each button to a device provided with a touch panel so that the device provided with the touch panel is operated in accordance with the control signal.

[Patent Document 1] JP2011-143557

User control of a touch panel includes a pinch-out in which the user touches two points and moves the touched positions outward to extend the interval between the two points and a pinch-in in which the user touches two points and moves the touched positions inward to narrow the interval between the two points. Normally, a pinch-out is used in for magnification and a pinch-in is used for reduction.

It is basically necessary to use multiple fingers to perform a multi-touch gesture like these that require touching multiple points on a touch panel at the same time so that it is difficult to perform a multi-touch gesture with a single stylus pen. For this reason, a user using a stylus pen to control a touch panel and attempting to perform a multi-touch gesture must stop using the stylus pen temporarily, perform a multi-touch gesture with fingers, and resume using the stylus pen. Thus, the user experiences inconvenience.

SUMMARY OF THE INVENTION

The present invention addresses the issue and a purpose thereof is to provide a technology of performing touch panel control equivalent to a multi-touch gesture in a simple manner and without using a finger.

To address the aforementioned issue, an input device (1) according to a mode of the embodiment comprises: a contact unit (10) including a plurality of areas capable of exciting a surface of a touch panel independently; a user control unit (22, 23) used by a user; and a control unit (30) that controls a state of the plurality of areas individually based on a pre-stored excitation pattern when the user control unit (22, 23) is used, wherein the excitation pattern describes a state transition pattern of the plurality of areas corresponding to a track of a multi-touch gesture.

Another mode of the embodiment relates to an input method. The method uses an input device (1) provided with a contact unit (10) and a user control unit (22, 23), and comprises: acknowledging user control in the user control unit (22, 23); and individually controlling, in response to user control by the user, a state of the plurality of areas formed in the contact unit (10) and capable of exciting a surface of a touch panel independently, based on a pre-stored excitation pattern, wherein the excitation pattern describes a state transition pattern of the plurality of areas corresponding to a track of a multi-touch gesture.

Optional combinations of the aforementioned constituting elements, and implementations of the embodiments in the form of methods, apparatuses, systems, recording mediums, and computer programs may also be practiced as additional modes of the embodiments.

According to the embodiment, it is possible to perform a touch panel control equivalent to a multi-touch gesture in a simple manner and without using a finger.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Figure 1:
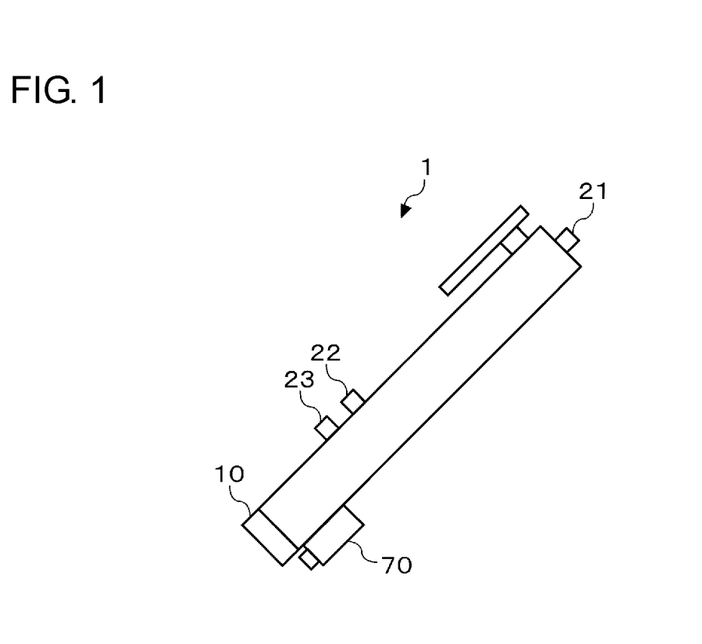
FIG. 1 shows an appearance of a pen-type input device according to an embodiment of the present invention.

FIG. 1 shows an appearance of a pen-type input device 1 according to an embodiment of the present invention. The input device 1 is a pointing device for controlling the touch panel of smart phones, tablets, car navigation devices, mobile game devices, or the like. Touch panels are available in a variety of types. For example, resistive film touch panels, capacitive touch panels, electromagnetic induction touch panels, surface acoustic wave touch panels, and infra-red touch panels are available. Capacitive touch panels include surface types and projected types.

In this embodiment, a description will be given of a case of using a projected capacitive type suitable for a multi-touch. Projected capacitive touch panels are built in a stack of a substrate layer carrying a control IC, a transparent electrode layer, and a protective film. The substrate layer is formed of a transparent member such as glass or plastic. The electrode layer is formed by a stack of two layers including a transversal electrode layer in which a plurality of transparent electrodes are arranged in a transversal direction and a longitudinal electrode layer in which a plurality of transparent electrodes are arranged in a longitudinal direction, they form a mosaic electrode pattern. A transparent electrode can be formed of, for example, indium tin oxide (IOT).

If a conductive body such as a finger approaches the electrode layer from above the protective film, capacitive coupling is produced between the conductive body and the electrode layer. Where capacitive coupling is produced, the value of capacitance between the approaching conductive body and the electrode layer increases. A variation in the capacitance value shows itself as a variation in the voltage.

Therefore, the control IC is capable of detecting the touched position by monitoring the voltage of the electrodes.

Generally, when the attempts to magnify a screen displayed on a touch panel display, user control for magnification is conveyed to the touch panel via a pinch-out gesture. When the user attempts to reduce a screen displayed on a touch panel display, user control for reduction is conveyed to the touch panel via a pinch-in gesture. Both of these gestures are multi-touch gestures and the touch panel needs to be capable of detecting a touch on multiple points. Multiple point detection is difficult in, for example, surface capacitive, surface acoustic, and infrared types.

As shown in FIG. 1, a contact unit 10 is formed at the end of the input device 1 according to the embodiment. A first user control unit 21, a second user control unit 22, a third user control unit 23, and an imaging unit 70 are mounted to the body of the input device 1. In the following description, the first user control unit 21 is described as a power button, the second user control unit 22 is described as a magnification button, and the third user control unit 23 is described as a reduction button.

The position of mounting the first user control unit 21, the second user control unit 22, the third user control unit 23, and the imaging unit 70 is as desired and can be modified as appropriate. For example, the imaging unit 70 may be mounted to a clip. User control buttons used to perform user control of types other than magnification and reduction and initiated by a multi-touch gesture may be additionally provided. In some smartphones, the user switches to a multi-task display screen by a gesture of touching four or five points and moving the points upward. A user control button to achieve this switching control may be added in the neighborhood of the second user control unit 22 and the third user control unit 23.

Figure 2:
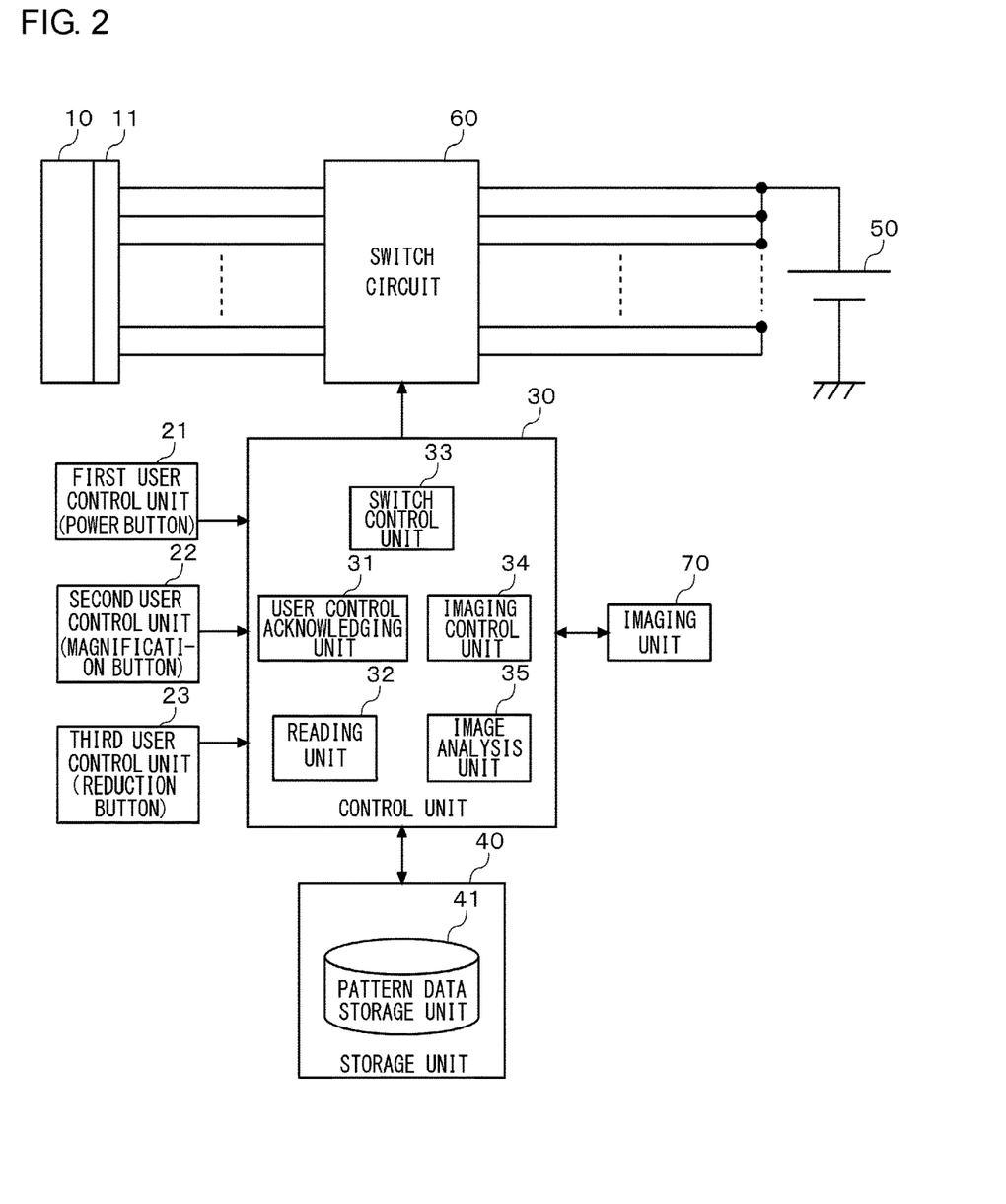
FIG. 2 shows an internal system structure of the input device of FIG. 1.

FIG. 2 shows an internal system structure of the input device 1 of FIG. 1. The input device 1 is provided with a power supply unit 50. The power supply unit 50 is provided with a small battery such as a AAA battery and a button battery. The battery may be charged externally. The contact unit 10 has a plurality of areas capable of exciting the surface of the touch panel independently. In this embodiment, the capacitive type is used so that the surface of the touch panel is excited electrically. The plurality of areas may be formed by segmenting the end face of the input device 1 into a plurality of blocks. An insulating member is inserted at the boundary between adjacent blocks so that the adjacent blocks are insulated from each other.

An electro member is placed in each of the areas forming the contact unit 10. Each electrode member is connected to the power supply unit 50 (positive electrode of the battery in FIG. 2) via a switch circuit 60. An insulating member 11 is formed on the back surface of the contact unit 10, preventing the electrode members of the contact unit 10 and the body of the input device 1 from being electrically coupled to each other other than via the wiring.

The switch circuit 60 includes a plurality of switches respectively inserted in a plurality of wirings connecting the electrode members of the contact unit 10 and the power supply unit 50. MOSFET, IGBT, relay, etc. may be used for the switch. By controlling the plurality of switches on and off independently, the status of the electrode members of the contact unit 10 is individually controlled. When the switch is turned on, the electrode member is in a conductive state. When the switch is turned off, the electrode member is in an insulated state.

The first user control unit 21, the second user control unit 22, and the third user control unit 23 output a user control signal to a control unit 30 when used by the user. When the button is used, an on/off signal indicating whether the button is pressed is output to the control unit 30.

The control unit 30 includes a user control acknowledging unit 31, a reading unit 32, a switch control unit 33, an imaging control unit 34, and an image analysis unit 35. FIG. 2 depicts only those functional blocks of the control unit 30 related to the process highlighted in the embodiment. The functions of the control unit 30 can be implemented by the coordination of hardware resources and software resources, or hardware resources alone. Processors, ROMs, RAMS, and other LSIs may be used as hardware resources. Programs like firmware may be used as software resources.

A storage unit 40 is provided with a storage medium such as a nonvolatile semiconductor memory. The storage unit 40 according to the embodiment includes a pattern data storage unit 41. FIG. 2 depicts only those functional blocks of the storage unit 40 related to the process highlighted in the embodiment. The pattern data storage unit 41 stores pattern data describing state transition patterns of the plurality of areas of the contact unit 10 corresponding to the track of multi-touch gestures. In other words, the pattern data is time-series data describing which area should be turned into a conductive state in each period of time.

Figure 3A:
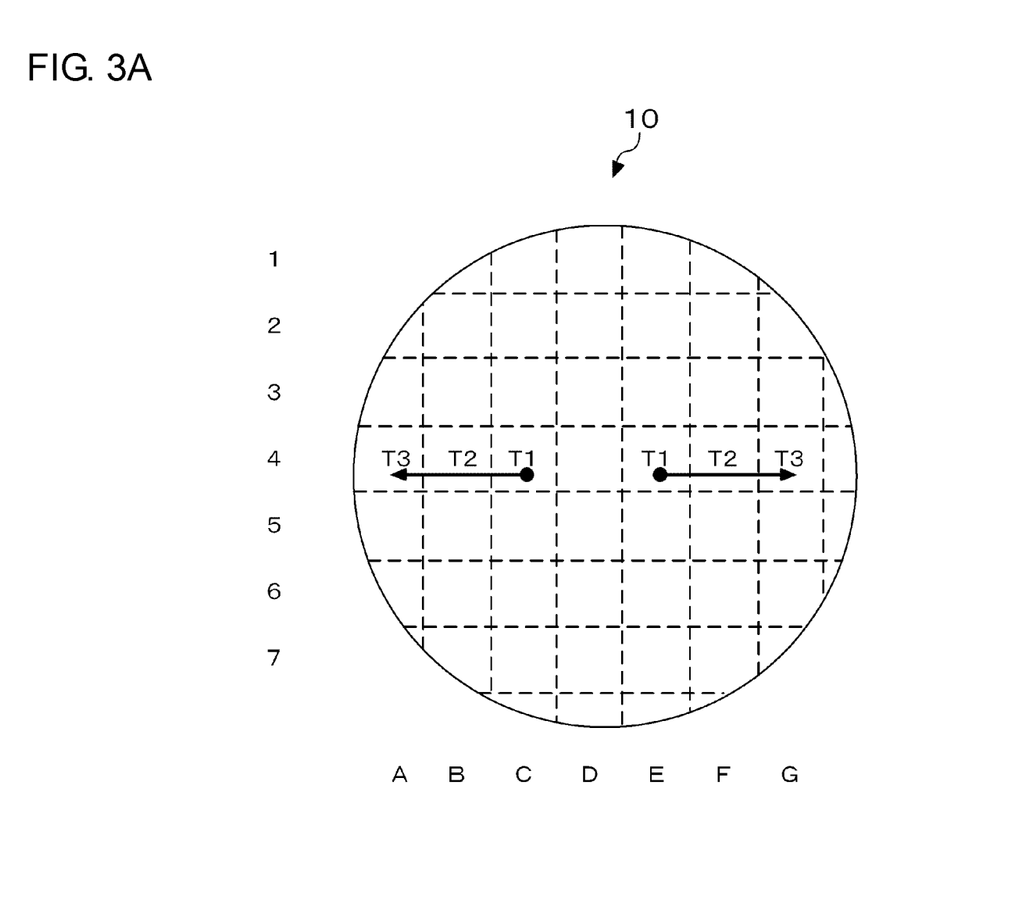
FIGS. 3A and 3B show how the control unit controls the plurality of areas of the contact unit when the user presses the magnification button.
Figure 3B:
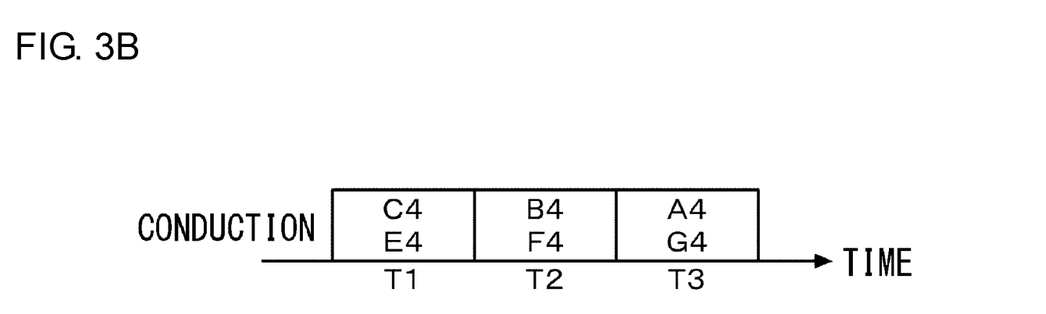

FIGS. 3A and 3B show the surface of the contact unit 10 and a pitch-out pattern. FIG. 3A shows that the surface of the contact unit 10 is segmented into blocks in a matrix. Each of the areas segmented as blocks is designated by a combination of an address in the x direction (A-G) and an address in the Y direction (1-7).

The embodiment enables individually controlling whether each of the areas of the contact unit 10 of the input device 1 caused by the user to contact the touch panel electrically excites the surface of the touch panel. In the input device 1 according to the embodiment used in the capacitive touch panel, the control unit 30 controls whether to place each of the areas in a conductive state or in an insulated state. More specifically, of the plurality of areas of the contact unit 10, the control unit 30 controls an area that should electrically excite the surface of the touch panel to be in a conductive state and controls an area that should not electrically excite the surface of the touch panel to be in an insulated state. The area that should electrically excite corresponds to an area at a position at which the control circuit of the touch panel should determine a touch.

FIGS. 3A and 3B show how the control unit 30 controls the plurality of areas of the contact unit 10 when the user presses the magnification button. During a period T1, the control unit 30 conducts an electric current in the electrode members of the areas C4 and E4 to place those areas in a conductive state and does not conduct an electric current in the electrode members of the other areas and places those areas in an insulated state. During a subsequent period T2, the control unit 30 conducts an electric current in the electrode members of the areas B4 and F4 and places those areas in a conductive state, and does not conduct an electric current in the electrode members of the other areas and places those areas in an insulated state. During a subsequent period T3, the control unit 30 conducts an electric current in the electrode members of the areas A4 and G4 and places those areas in a conductive state, and does not conduct an electric current in the electrode members of the other areas and places those areas in an insulated state. Consequently, the electrode of the touch panel capacitively coupled to the contact unit 10 of the input device 1 changes in the direction of the arrow with time. This allows the control circuit of the touch panel to recognize that a pinch-out gesture is performed.

When the user presses the reduction button, the control unit 30 controls the state of the plurality of areas of the contact unit 10 in accordance with a pinch-in pattern opposite to the pinch-out pattern described above. In a normal state in which the user does not press the magnification button or the reduction button, all of the areas of the contact unit 10 are controlled to be in a conductive state. This allows the control circuit of the touch panel to recognize a single touch. If the areas controlled to be in a conductive state are in the same block, it is not necessarily to control all of those areas to be in a conductive state.

Reference is made back to FIG. 2. When the user uses one of the first user control unit 21 (power button), the second user control unit (magnification button), and the third user control button (reduction button), the user control acknowledging unit 31 of the control unit 30 receives a user control signal from the associated user control unit. The reading unit 32 reads the pattern data associated with the user control signal from the pattern data storage unit 41. For example, when the magnification button is pressed, the reading unit 32 reads the pattern data for a pinch-out from the pattern data storage unit 41. When the reduction button is pressed, the reading unit 32 reads the pattern data for a pinch-in from the pattern data storage unit 41.

The switch control unit 33 controls the switch circuit 60 based on the pattern data thus read. The switch circuit 60 is provided with switches for respective wirings connected to the plurality of areas of the contact unit 10. Therefore, the switch circuit 60 is capable of switching the areas into a conductive state or an insulated state individually.

Depending on the control circuit of the touch panel, shifts in the position of conduction based on the pattern data may be too fast or too slow, causing a certain multi-touch gesture not to be recognized by the control circuit of the touch panel. A description will be given below of the structure and process that address the issue. The structure and process described hereinafter are optional and are not essential elements of the input device 1 according to the embodiment.

The imaging unit 70 is mounted to the input device 1. More specifically, a small camera is mounted to the end of the input device 1 or to a clip. The camera is mounted in a position and orientation where the surface of the touch panel contacted by the contact unit 10 (the display unit of the device provided with the touch panel) can be imaged. The camera is equipped with a movie mode or a continuous shooting mode.

The imaging unit 70 is provided with a solid-state image sensing device such as a CCD image sensor and a CMOS image sensor, and a signal processing circuit for processing signals output from the solid-state image sensing device. For example, the signal processing circuit performs signal processes such as noise removal and A/D conversion. The imaging unit 70 outputs an image captured to the control unit 30.

When the user uses the second user control unit (magnification button) or the third user control unit (reduction button), the imaging control unit 34 instructs the imaging unit 70 to start imaging. In response to the instruction, the imaging unit 70 starts capturing a movie or continuous shots. These processes are performed before a series of steps of control by the switch control unit 33 in the plurality of areas of the contact unit 10 based on the pattern data are started. When a series of steps of control by the switch control unit 33 in the plurality of areas of the contact unit 10 based on the pattern data are completed, the imaging control unit 34 instructs the the imaging unit 70 to stop imaging. In response to the instruction, the imaging unit 70 stops capturing a movie or continuous shots.

After the series of steps of control above are completed, the image analysis unit 35 analyzes an image of the touch panel captured by the imaging unit 70. More specifically, the image analysis unit 35 compares an image captured before the series of steps of control above were started with an image captured when the series of steps of control are completed. The image analysis unit 35 compares the images and determines whether the process based on user control designated via the input device 1 on the touch panel side is executed.

The image analysis unit 35 uses, for example, a known object detection algorithm to detect an object in the image captured before the series of steps above were started. For example, the image analysis unit 35 detects a character string in the image as an object. The image analysis unit 35 generates an identifier of the object detected. The image analysis unit 35 searches for the object by magnifying or reducing the identifier in the image captured after the series of steps of control above are completed.

The image analysis unit 35 determines the size of the object detected in the image captured after the series of steps of control above are completed and determines whether the process based on user control for magnification or user control for reduction designated via the input device 1 is executed on the touch panel side. If the process designated by user control is not executed, the reading unit 32 reads a pattern data describing a status transition pattern that realizing the same multi-touch gesture with a different sensitivity from the pattern data storage unit 41. The switch control unit 33 controls the switch circuit 60 based on the pattern data thus read. The state transition pattern with a different sensitivity is, for example, a pattern in which the time interval between shifts in positions of conduction is changed. Alternatively, a pattern in which the range of unit areas is changed may be used. For example, a block comprised of a plurality of adjacent areas (e.g., four areas, nine areas) may be dealt with as a unit area for the purpose of increasing the sensitivity. The plurality of areas in a block are controlled to be in the same state. This is equivalent to changing the size of the tip of a pen.

Figure 4A:
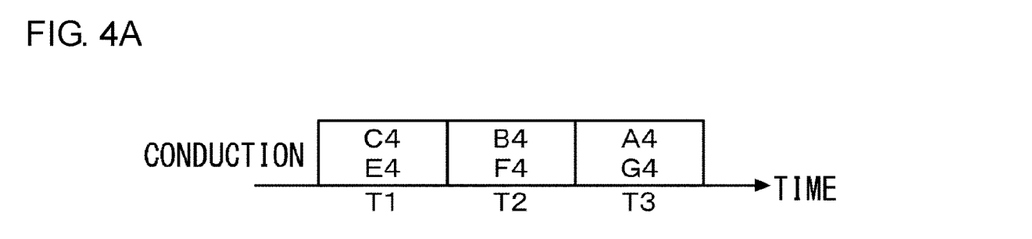
FIGS. 4A and 4B show examples of state transition patterns before and after changing the sensitivity.
Figure 4B:
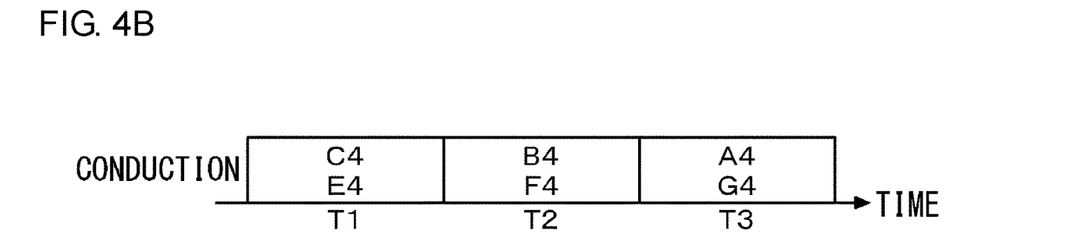

FIGS. 4A and 4B show examples of state transition patterns before and after changing the sensitivity. The state transition pattern of FIG. 4A corresponds to the state transition pattern of FIG. 3B. The state transition pattern of FIG. 4B is an example in which the time interval of shifts between positions of conduction of FIG. 4A is extended. If the speed of shifts between positions of conduction based on the state transition pattern of FIG. 4A is too fast, the control circuit of the touch panel may not be able to follow the touched position. In this case, the likelihood that the control circuit of the touch panel can follow the touched position will be increased by extending the time interval between shifts in positions of conduction. If it is determined that the process designated by user control is still not performed under the control based on the state transition pattern of FIG. 4A, a retry may be made based on a state transition pattern in which the time interval between shifts in positions of conduction is further extended.

Conversely, the control circuit of the touch panel may equally not be able to recognize a sequence of gesture if the the speed of shifts in positions of conduction is too slow. In this case, the likelihood that the control circuit of the touch panel can recognize a sequence of gesture will be increased by reducing the time interval between shifts in positions of conduction. If the process designated by user control is not performed on the touch panel side even under the control based on the state transition pattern following the change in the sensitivity, a retry may be made based on a state transition pattern in which the time interval between shifts in positions of conduction is further reduced. A retry based on a state transition pattern in which the time interval between shifts in positions of conduction is extended and a retry based on a state transition pattern in which the time interval between shifts in positions of conduction is reduced may be made alternately.

Figure 5:
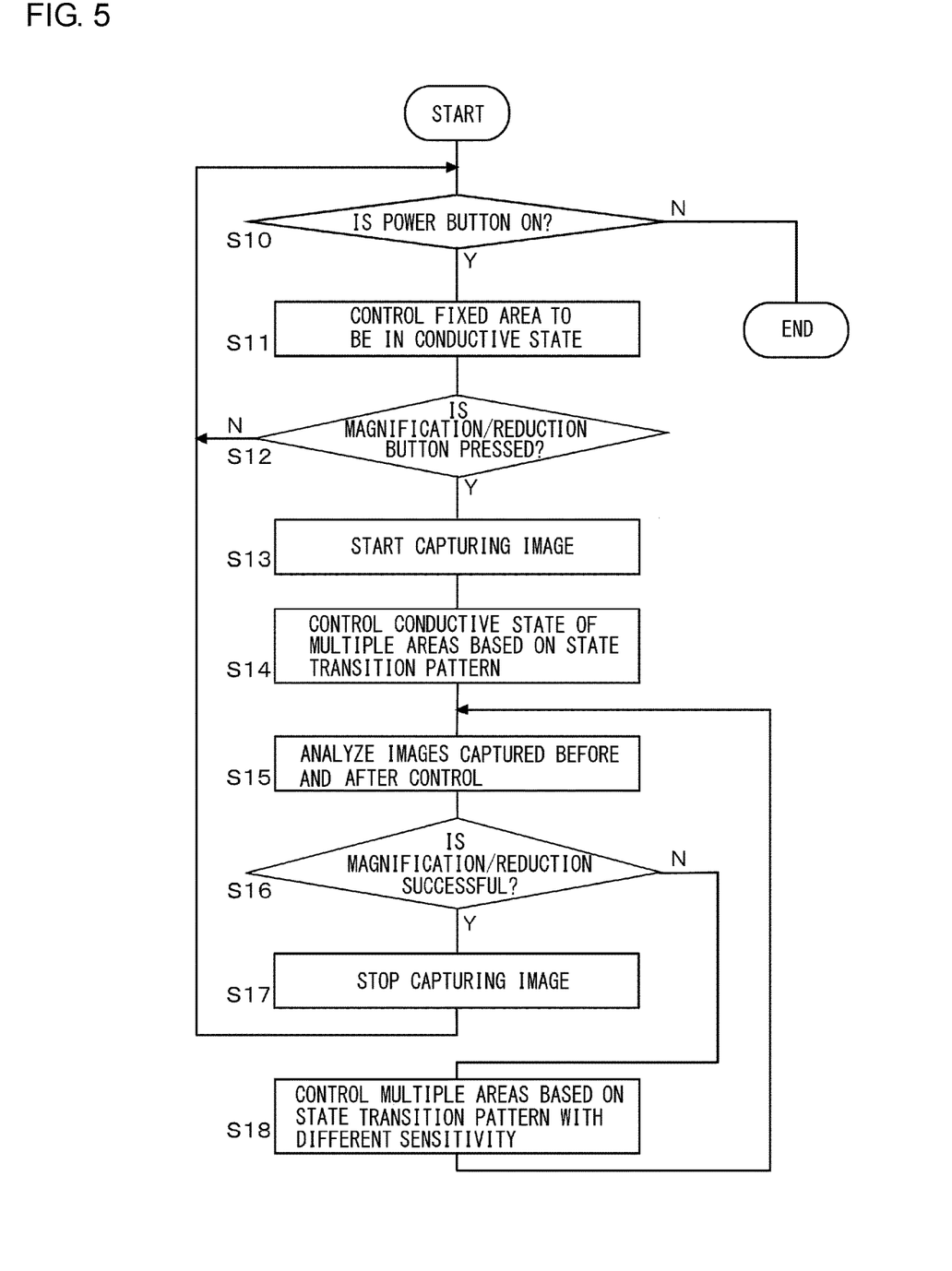
FIG. 5 is a flowchart showing the flow of operation of the input device according to the embodiment.

FIG. 5 is a flowchart showing the flow of operation of the input device 1 according to the embodiment. The user control acknowledging unit 31 acknowledges a user control signal from the first user control unit 21 (power button). When the signal indicates that power should be turned on (Y in S10), the switch control unit 33 controls the switch circuit 60 to control a fixed area in the contact unit 10 to be in a conductive state (S11). When the user control acknowledging unit 31 receives a user control signal from the second user control unit (magnification button) or the third user control unit 23 (reduction button) (Y in S12), the imaging control unit 34 causes the imaging unit 70 to capture an image of the touch panel subject to user control (S13). The switch control unit 33 controls the switch circuit 60 based on a state transition pattern of the corresponding user control and controls the state of the plurality of areas of the contact unit 10 (S14).

The image analysis unit 35 analyzes an image of the touch panel captured before the control is started and an image of the touch panel after the control is completed (S15). If the user control for magnification/reduction is determined to be successful as a result of image analysis (Y in S17), the imaging control unit 34 causes the imaging unit 70 to stop capturing an image of the touch panel (S18). Control is then turned to step S10. If power-off is designated in step S10 (N in S10), the whole process is terminated.

If the user control for magnification/reduction is determined to be unsuccessful as a result of image analysis (N in S17), the switch control unit 33 controls the switch circuit 60 based on a state transition pattern with a different sensitivity and controls the state of the plurality of areas of the contact unit 10 accordingly (S18). Control is then turned to step S15, whereupon step S16 and the subsequent steps are repeated.

In the structure in which the imaging unit 70 is not mounted, steps S13, S15-S18 are not necessary. If it is desired to increase the magnification factor, the process shown in FIG. 5 may be repeated multiple times by pressing the magnification button multiple times. If it is desired to increase the reduction factor, the process shown in FIG. 5 may be similarly repeated multiple times by pressing the reduction button multiple times. Further, a plurality of pinch-out/in patterns may be made available and the pattern used may be selected in accordance with the duration in which the magnification/reduction button is pressed. In ordinary touch panels, the longer the track of magnification/reduction between two points touched, the higher the magnification factor/reduction factor so that a plurality of patterns with different tracks may be made available.

As described above, the embodiment enables user control corresponding to a multi-touch gesture on a touch panel in a simplified manner only by pressing a user control button of the pen-type input device 1. Optionally, the imaging unit 70 may be provided to verify whether user control designated by a multi-touch gesture is executed on the touch panel side. If the designated user control is not executed, a retry is made with a state transition pattern with a different sensitivity. This enables the user to use touch panels of various types in a responsive manner.

Described above is an explanation based on an exemplary embodiment. The embodiment is intended to be illustrative only and it will be obvious to those skilled in the art that various modifications to constituting elements and processes could be developed and that such modifications are also within the scope of the present invention.

As compared with user control with a finger, a multi-touch gesture using a small contact surface at a pen tip is often unrecognized by the device on the touch panel side as a multi-touch gesture. This is primarily because of a small transition between touched positions or a relatively small contact area at a touched position. In order to address this issue, the device on the touch panel side may be provided with a function to determine whether the touch panel is touched by a finger or controlled by the pen-type input device 1. If the touch panel is controlled by the pen-type input device 1, threshold values for determination of a multi-touch gesture may be changed to threshold values suitable for detection of a touch by the pen-type input device 1.

The embodiment is described above as being applied to the pen-type input device. The input device to which the invention is applied may not be limited to that of pen-type. The invention may also be applied to a finger portion of a glove.

The capacitive touch panel is described above by way of example. In the case of a resistive film touch panel, the input device 1 may be configured as described below. A driving mechanism for physically moving the areas of the contact unit 10 upward and downward individually in the direction of pen shaft is provided. The control unit 30 controls the driving mechanism based on pattern data describing a physical state transition of the plurality of areas of the contact unit 10. Thus, a multi-touch gesture can be realized exciting the surface of the touch panel physically instead of electrically. In the resistive film type, the resistance at a location receiving physical excitation varies so that the device on the touch panel side is capable of detecting a touched position.

The driving mechanism may similarly be used in a touch panel of a projected capacitive type so that the capacitance between the electrode layer of the touch panel and the electrode member of the contact unit 10 may be changed by individually adjusting the distance between the electrode layer and the electrode member using the driving mechanism instead of the switch circuit 60. Further, in the case of an electromagnetic induction touch panel, each of the areas of the contact unit 10 may be provided with a coil and the conductive state of the coils may be controlled individually.

What is claimed is:

1. An input device comprising:
   a contact unit including a plurality of areas that excites a surface of a touch panel independently;
   a user control unit used by a user;
   a control unit that controls a state of the plurality of areas individually based on a pre-stored excitation pattern that describes a state transition pattern of the plurality of areas corresponding to a track of a multi-touch gesture when the user control unit is used; and
   an imaging unit that captures an image of a display unit of a device that includes the touch panel that the contact unit comes into contact with, wherein the control unit analyzes the image of the touch panel captured during or after a series of steps of control in the plurality of areas based on the pre-stored excitation pattern, and wherein when a process based on user control is determined to not be executed on the surface of the touch panel, the control unit performs a series of steps of control in the plurality of areas based on the pre-stored excitation pattern with a different sensitivity.

2. The input device according to claim 1, wherein the control unit controls a first area of the plurality of areas that excites the surface of the touch panel to be in a conductive state, and wherein the control unit controls a second area of the plurality of areas that does not excite the surface of the touch panel to be in an insulated state.

3. An input method using an input device provided with a contact unit and a user control unit, comprising:

acknowledging user control by a user in the user control unit;

individually controlling, in response to the user control by the user, a state of a plurality of areas formed in the contact unit and capable of exciting a surface of a touch panel independently, based on a pre-stored excitation pattern, that describes a state transition pattern of the plurality of areas corresponding to a track of a multi-touch gesture; and capturing an image of a display unit of a device that includes the touch panel that the contact unit comes into contact with, wherein the individually controlling analyzes the image of the touch panel captured during or after a series of steps of control in the plurality of areas based on the pre-stored excitation pattern, and wherein when a process based on the user control is determined to not be executed on the surface of the touch panel, the control unit performs a series of steps of control in the plurality of areas based on the pre-stored excitation pattern with a different sensitivity.

* * * * *